US008150121B2

(12) United States Patent
Gindele et al.

(10) Patent No.: US 8,150,121 B2
(45) Date of Patent: Apr. 3, 2012

(54) INFORMATION COLLECTION FOR SEGMENTATION OF AN ANATOMICAL OBJECT OF INTEREST

(75) Inventors: Edward B. Gindele, Rochester, NY (US); Lawrence A. Ray, Rochester, NY (US); Richard A. Simon, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 643 days.

(21) Appl. No.: 12/341,011

(22) Filed: Dec. 22, 2008

(65) Prior Publication Data

US 2009/0279755 A1 Nov. 12, 2009

Related U.S. Application Data

(60) Provisional application No. 61/050,723, filed on May 6, 2008.

(51) Int. Cl.
*G06K 9/00* (2006.01)
(52) U.S. Cl. ........................................................ 382/128
(58) Field of Classification Search .................. None
See application file for complete search history.

(56) References Cited

U.S. PATENT DOCUMENTS

| 4,656,665 | A | 4/1987 | Pennebaker | |
|---|---|---|---|---|
| 6,249,594 | B1* | 6/2001 | Hibbard | 382/128 |
| 6,385,332 | B1* | 5/2002 | Zahalka et al. | 382/128 |
| 6,542,153 | B1 | 4/2003 | Liu et al. | |
| 7,929,739 | B2* | 4/2011 | Li | 382/128 |
| 2007/0217665 | A1* | 9/2007 | Kiraly et al. | 382/128 |
| 2007/0230763 | A1* | 10/2007 | Matsumoto et al. | 382/131 |
| 2008/0044080 | A1 | 2/2008 | Li | |
| 2009/0060308 | A1* | 3/2009 | Dawant et al. | 382/131 |

OTHER PUBLICATIONS

Cohen et al.: "*Global Minimum for Active Contour Models: A Minimal Path Approach*," International Journal of Computer Vision, vol. 24, No. 1, pp. 57-78, Aug. 1997.
Sun et al.: "*Computation of Minimum-Volume Covering Ellipsoids*," Operations Research, vol. 52, No. 5, pp. 690-706, Sep.-Oct. 2004.
Digital Imaging and Communications in Medicine PS 3.3—*Standards Manual*, National Electrical Manufacturers Association, 1999 (http://www.nema.org/stds).
Commonly assigned application U.S. Appl. No. 61/050,752, entitled "Method for Interactively Determining a Bounding Surface for Segmenting a Lesion in a Medical Image", provisionally filed May 6, 2008.
Commonly assigned application U.S. Appl. No. 61/050,736, entitled "Method for Editing 3D Image Segmentation Maps", provisionally filed May 6, 2008.
Stephen McCarthy, et al., "Segmentation algorithm for objects with very low edge contrast," Proc SPIE, vol. 5608, 2004, pp. 162-168, XP040193157.
Igarashi et al.: "Teddy: A Sketching Interface for 3D Freeform Design" ACM SIGGRAPH 99, 1999, in Proceedings of SIGGRAPH1999, pp. 409-416.

* cited by examiner

*Primary Examiner* — Vinh Nguyen

(57) ABSTRACT

A method of collecting information regarding an anatomical object of interest includes displaying an image characterized by a first region and a second region, wherein the first and second regions are mutually exclusive and the object is displayed within the second region, selecting first and second points spanning the object in the displayed image, at least one of the points being within the first region, and extracting a plurality of statistical values from image voxels, lying on a line segment between the first and second points, that correspond to the object.

20 Claims, 5 Drawing Sheets

INFORMATION COLLECTION FOR SEGMENTATION OF AN ANATOMICAL OBJECT OF INTEREST

CROSS REFERENCE TO RELATED APPLICATIONS

Priority is claimed from U.S. Ser. No. 61/050,723, provisionally filed on May 6, 2008, entitled "STATISTICS COLLECTION FOR LESION SEGMENTATION", in the name of Edward B. Gindele et al., commonly assigned and incorporated herein by reference.

FIELD OF THE INVENTION

The present invention relates to the field of digital imaging, and more particularly to segmenting a lesion in a digital medical image.

BACKGROUND OF THE INVENTION

Image segmentation is a branch of digital image processing that performs the task of categorizing, or classifying, the elements of a digital image into one or more class types. For medical imaging applications, it is common that image segmentation is performed on the voxel (volume element) of a 3-dimensional image data set with the classification types related to anatomical structure. In thoracic medical images, it is convenient to segment the image voxels into classes such as bone, lung parenchyma, soft tissue, bronchial vessels, blood vessels, etc. There are many reasons to perform such a task, such as surgical planning, treatment progress, and patient diagnosis.

Of interest is the image segmentation technology that allows a user of a Picture Archiving and Communications System (PACS) to segment a suspected cancerous lesion. Starting with a seed point, i.e., a voxel position that is known to be part of a lesion, a region of contiguous voxels is grown, or developed, about the seed point. For such lesion segmentation algorithms, the only voxel value know for certainty that is characteristic of the lesion to be segmented is the seed point voxel. Thus, the statistical properties of the voxels associated with the lesion to be segmented, such as the mean voxel value and the range of voxel values, must either be assumed a priori from experience or approximated. Typical algorithmic approaches approximate these statistical quantities by sampling the voxel values within a 2-dimensional or 3-dimensional region about the selected seed point.

Often the statistical approximations made for a given lesion segmentation application are specific to the intended type of lesion tissue being segmented. For example, for pulmonary lesions the mean voxel value can be approximated by the value of the seed voxel, and the range of voxel values can be approximated from experience as ranging from approximately −400 Hounsfield Units (HU) and above. For liver lesion segmentation, however, these statistical quantities may not be useful. What is needed is a statistical sampling algorithm that can approximate the statistical properties of the lesion without regard to lesion type.

SUMMARY OF THE INVENTION

In an exemplary embodiment of the present disclosure, a method of collecting information regarding an anatomical object of interest includes displaying an image characterized by a first region and a second region, wherein the first and second regions are mutually exclusive and the object is displayed within the second region, selecting first and second points spanning the object in the displayed image, at least one of the points being within the first region, and extracting a plurality of statistical values from image voxels, lying on a line segment between the first and second points, that correspond to the object. In such an embodiment, the first region corresponds to a first tissue type and the second region corresponds to a second tissue type different than the first tissue type. In addition, the first region is characterized by a first mean voxel value, and the second region is characterized by a second mean voxel value greater than the first mean voxel value. Such a method also includes calculating a probability distribution based on the plurality of statistical values. Such a method further includes noise filtering a plurality of voxel values associated with the image voxels, wherein the plurality of statistical values are extracted from the noise-filtered voxel values, and segmenting the second region into a target portion and a remainder portion based on the noise-filtered voxel values. Such a method also includes segmenting the second region into a target portion and a remainder portion based on the plurality of statistical values, wherein segmenting the second region comprises calculating threshold values based on the plurality of statistical values and classifying the image voxels based on the calculated threshold values. Such a method also includes calculating a standard deviation of the plurality of statistical values, wherein the threshold values are calculated using the standard deviation and a median value of the plurality of statistical values. In addition, in such a method the object comprises a lesion.

In another exemplary embodiment of the present disclosure, a method of collecting information regarding an anatomical object of interest includes displaying an image illustrating a first region and a second region, wherein the object is displayed within the second region, selecting first and second points spanning the object in the displayed image, at least one of the points being within the first region, extracting a plurality of statistical values from image voxels, lying on a line segment between the first and second points, that correspond to the object, determining a median statistical value from the plurality of statistical values, and determining an upper threshold value and a lower threshold value based on the median statistical value. Such an exemplary method further includes calculating a standard deviation of the plurality of statistical values, wherein the upper and lower threshold values are based on the standard deviation and the median statistical value. Such an exemplary method further includes classifying each of the image voxels based on the upper and lower threshold values, calculating a set of noise-filtered voxel values corresponding to the image voxels, and segmenting the image based on the set of noise-filtered voxel values. In addition, in such a method the object comprises a lesion.

In a further exemplary embodiment of the present disclosure, a method of collecting information regarding an anatomical object of interest includes displaying an image of a boundary of the object, selecting first and second points proximate the boundary, the first and second points approximating end points of a maximum diameter defined by the boundary, generating a first boundary point, the first boundary point being formed by the intersection of the boundary, and a line passing through the first and second points, generating a second boundary point, the second boundary point being formed by the intersection of the boundary and the line, and extracting a plurality of statistical values corresponding to points on the line between the first and second boundary points. In such an exemplary embodiment, the method further includes calculating a set of noise-filtered voxel values corresponding to the points on the line between the first and second boundary points, and segmenting the boundary based on the set of noise-filtered voxel values. The method also includes segmenting the boundary into a target portion and a remainder portion based on the plurality of statistical values, calculating threshold values, and characterizing image voxels corresponding to the points on the line between the first and second boundary points based on the calculated threshold values.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
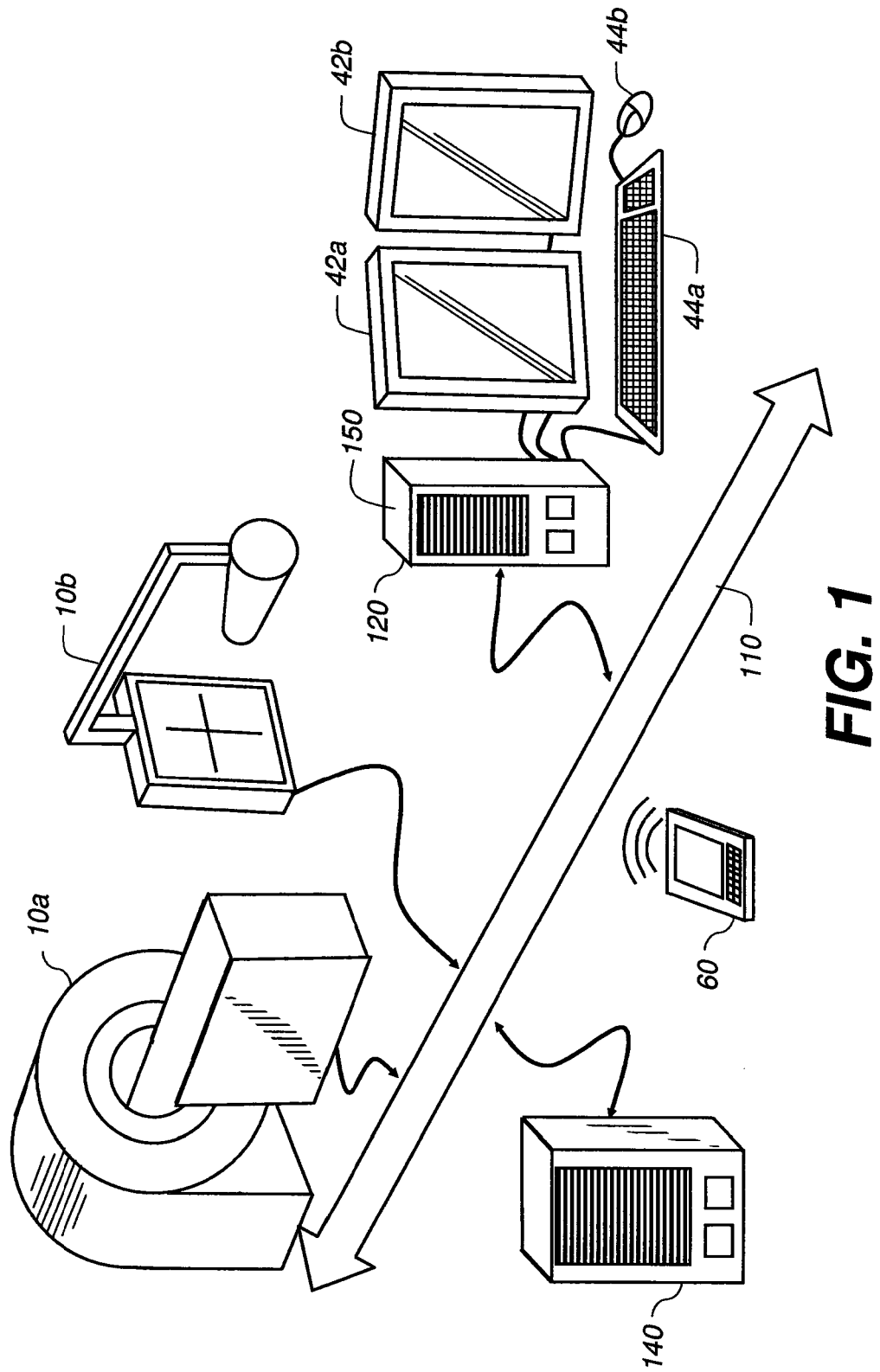
FIG. 1 is a diagram showing a medical imaging communications network of connected computers suitable for practicing embodiments of the present disclosure.

Embodiments of the present disclosure provide an operator of a PACS medical imaging diagnostic workstation the ability to segment anatomical regions of interest in digital medical images without a priori knowledge of the particular type of anatomical region to be segmented. Embodiments of the present disclosure also allow significant freedom of choice with regard to the selection of points that relate to an anatomical region to be segmented. In particular, two points are selected by an operator of a PACS workstation that can be outside, inside, or on the boundary of the anatomical region and its surrounding background region.

Reference is made to commonly assigned application U.S. Ser. No. 61/050,752, entitled "METHOD FOR INTERACTIVELY DETERMINING A BOUNDING SURFACE FOR SEGMENTING A LESION IN A MEDICAL IMAGE", provisionally filed on May 6, 2008, the entire disclosure of which is incorporated herein by reference.

Reference is also made to commonly assigned application U.S. Ser. No. 61/050,736, entitled "METHOD FOR EDITING 3D IMAGE SEGMENTATION MAPS", provisionally filed on May 6, 2008, the entire disclosure of which is incorporated herein by reference.

Many medical imaging applications are implemented via a PACS. These systems provide a way for displaying digital images acquired by a wide variety of medical imaging modalities such as, but not limited to, projection radiography (x-ray images), computed tomography (CT images), ultrasound (US images), and magnetic resonance (MR images). Each of the above mentioned medical imaging modalities contain slightly different diagnostic information. In particular, CT and MR images, when viewed and studied by a radiologist, can reveal much detail about a patient's 3-dimensional internal anatomy. Computer algorithm technology can also be applied to medical images to enhance the rendering of the diagnostic information, to detect an abnormal condition, i.e., computer aided detection (CAD), and to make measurements relating to the patient's condition, i.e., computer aided measurement (CAM).

Exemplary methods of the present disclosure may employ a computer algorithm for segmenting a portion of a medical image with anatomical relevance. In an exemplary embodiment, the methods described herein may be used for the segmentation of abnormal pulmonary lesion tissue from normal tissue. In such an embodiment, a user of the PACS system, usually a radiologist may review a thoracic CT exam on a medical PACS and may indicate to the CAM segmentation software the position and orientation of a suspected pulmonary lesion. Typically, the user supplies two point locations associated with the suspected lesion while viewing an axial slice of the CT exam. Optionally, the user can supply more than two points within the exam. The voxel positions indicated by the user can be located near, but not necessarily exactly on or within, the boundary of the pulmonary lesion. Alternatively, the user can supply two points, one or both of which are wholly within the lesion tissue region. The CAM segmentation software embodying the technology of the present disclosure may then identify voxels that are part of the pulmonary lesion, i.e. a segmentation of the lesion tissue is performed. Once the region associated with the pulmonary lesion has been segmented features of the lesion can be quantified analytically such as the corresponding volumetric size.

Although exemplary embodiments of the present disclosure may be described as a software program, those skilled in the art will readily recognize that the equivalent of such software can also be constructed in hardware.

FIG. 1 shows a medical imaging communications network that includes multiple connected computers. Such a network of computers provides a way of sending and receiving information between any two or more connected computers. Medical digital images may be generated by imaging a patient (not shown) with an image capture device. An image capture device 10a symbolically represents a number of medical digital image modality devices such as, but not limited to, a computed tomography scanning device (CT) or Magnetic Resonance imaging scanning device (MR) that are capable of producing 3-dimensional digital images of patient anatomy.

A patient may be positioned on a movable table within the capture device assembly such that the patient can be moved relative to the signal source of the capture device. The capture device receives the signals that have passed through the patient in raw form, processes these signals, and produces a slice digital image. Each slice digital image represents a cross-section, or slice, through the patient anatomy. Repositioning the patient relative to the source signal and acquiring other slice digital images can generate a slice image series. Typically this is done by placing the patient on a bed that can be moved relative to the imaging apparatus. A slice image series, assembled in proper order, can represent the full 3-dimensional volume of an imaged patient.

Also connected to a communications network 110 is a digital radiographic (DR) capture device 10b capable of producing digital x-ray images. As such, the images produced by a DR capture device typically are one or more 2-dimensional digital images each representing a different exposure and/or imaging path through the patient. For example, the DR capture device 10b can be used to acquire multiple projection radiographic digital images with its x-ray source located in different positions relative to the patient. The resulting DR radiographic digital images can be processed to produce a set of tomosynthesis slice digital images that represent a 3-dimensional digital image of the patient.

The slice digital images (not shown) produced by the capture device 10a are transmitted via the communications network 110 to an image archive computer 140 where, along with patient history information, they become part of an electronic patient history record. The main function performed by the image archive computer 140 is the facilitation of transfer or exchange of image information rather than the processing of information. The image archive computer 140 serves as a large storage repository of digital images and other, but unspecified, medical information. The arrows in the diagram of FIG. 1 represent the exchange of information, which in general, is bi-directional i.e.; the flow of information can be in either direction.

The slice images are later queried on a diagnostic workstation computer 120, sometimes referred to as a PACS, for viewing and examination by a radiologist or similarly trained medical professional. The diagnostic workstation computer 120 can have multiple electronic displays connected for viewing medical images. Two such electronic display devices 42a and 42b are shown in FIG. 1. Also connected to the diagnostic workstation computer 120 are input devices 44a and 44b depicted here as keyboard and mouse devices, respectively. Although embodiments of the present disclosure may be operable within the context of a diagnostic workstation computer, it should be noted that any computing device capable of displaying and processing image data might be used. For example, a mobile computer 60 shown in FIG. 1 can be used with the present invention. Thus it is not necessary for the computer to be physically connected to the communications network 110.

A PACS can be defined as a system that acquires, transmits, stores, retrieves, and displays digital images and related patient information from a variety of imaging sources and communicates the information over a network. By this definition, the diagnostic workstation computer 120 shown in FIG. 1 can represent a PACS. Similarly, the combination of the diagnostic workstation computer 120, mobile computer 60, image archive computer 140, and communication network 110 can collectively be considered a PACS. In addition to the patient digital images, PACS transmit, receive, and store other electronic patient record information such as, but is not limited to, non-image information (meta-data) such as age, sex, medical history, prescribed medications, symptoms, etc.

For the purposes of this disclosure, the collection of interconnected computers including the communications network will be also be referred to as a "DICOM" network since DICOM (Digital Imaging and Communications in Medicine PS 3.3-1999, National Electrical Manufacturers Association, 1999) formatted digital images are currently the industry standard and the most prevalent file encoding used for medical digital images. Typically a 3-dimensional volume image is constructed from set of 2-dimensional slice digital images wherein each slice digital image is encoded as an individual DICOM file.

Often an individual digital image data element, i.e., single value representing measured image signal intensity, is referred to as a voxel for 3-dimensional images and a pixel for 2-dimensional images. The term "voxel" is commonly used to characterize a volume-element whereas the term "pixel" is commonly used to characterize a picture-element. Exemplary embodiments of the present disclosure can be applied to 2-dimensional and 3-dimensional images. As such, for the purposes of the present disclosure, the terms voxel and pixel should be considered interchangeable, i.e., describing an image elemental datum capable of having a range of numerical values. Voxel and pixels can be said to have the attributes both of location and value.

With the medical imaging system setup as described above and shown in FIG. 1, a medical professional, such as a radiologist, uses the keyboard 44a or mouse 44b to indicate to a software application program 150, running on the diagnostic workstation computer 120, the desired patient record to be loaded into memory. The CT digital image exam, i.e., the set of CT slice digital images, is then retrieved from the image archive computer 140 and displayed on the electronic display devices 42a and 42b. After viewing the image data, the medical professional indicates to the system the location of a suspected pulmonary lesion with a click of the mouse, input device 44b. Typically, this is performed by sequentially scrolling through the 2-dimensional slices digital images and selecting the slice digital image that best shows the suspected pulmonary lesion.

Embodiments of the present disclosure may be used for the purpose of collecting statistical information regarding an anatomical region or object of interest, such as lesion tissue, i.e., localized abnormal tissue regions. However, any localized anatomical region or object of interest within a set of medical diagnostic digital images can serve as the focus region of the collection of statistical information. For example, an anatomical region or object of interest could be an entire organ such as the liver.

The statistical collection technology described herein may be used in conjunction with a computer graphical user interface (GUI). The Microsoft Windows operation system was used to develop the prototype for this technology. However, those skilled in the art will recognize that the technology described herein can be used with any other computer operation system that allows the user to interact with digital images and allows the users to select points with an input device.

In an exemplary embodiment of the present disclosure, a user of the system views a digital medical image exam, such as a CT exam, on the electronic displays device 42a and/or 42a shown in FIG. 1. The user then identifies a region or object of interest by scrolling through the slices of the CT exam while viewing one of, but not limited to, the following: an axial, coronal, or sagittal slice. The user can also view the digital image representation as a multi-planar reconstruction, which is essentially an interpolated view of the CT data that is constructed at an arbitrary orientation with respect to the axial, coronal, and sagittal views.

The user activates the segmentation algorithm by pressing a menu option or button on the GUI that places the software in "segment-a-lesion" mode. The software may wait for the user to make a selection of two points. Several methods were used in experimentation, and an exemplary method for selecting the two points is the click and drag method. In this setup, the user selects a first point (shown as point 202 of FIG. 2) by clicking and holding down a button of a mouse shown as input control device 44b in FIG. 1. Then the user moves the mouse to the location of the second selected point (shown as point 203 of FIG. 2) and releases the mouse button. The software of the GUI receives these mouse events, i.e. the mouse click down and mouse release up events, and records the screen locations corresponding to these events. The screen locations for each selected point are then translated into a corresponding point location within the CT exam voxel data.

In addition, while the user is moving the mouse (and holding the mouse button down), the software draws a line between the first selected point and the current location of the mouse. The software also displays the length of the line in real world units. The scaling coefficients needed to convert the length of the line from voxel units to real world units are obtained by reading information stored in the DICOM header information accompanying the CT voxel data.

Alternatively, the user interface for the selection of multiple points can be constructed by allowing the user to click and release the mouse button once for each selected point. For this interface, the user may press a different button on the GUI to indicate that the selection of points is completed.

In clinical practice, radiologists often report the size of the lesion by using a measured line. The known Response Evaluation Criteria in Solid Tumors (RECIST) criterion is typically used as a guideline for this measurement operation. Radiologists are accustomed to using point and click devices within the context of a PACS to draw a line between two selected points on the boundary of a lesion. Typically, the radiologist selects the axial slice for which the lesion presents the largest cross-sectional area (judged by visual inspection) and selects two points that represent the linear diameter of the lesion within that slice. Optionally, the radiologist can also choose to measure the cross diameter of the lesion, i.e. the largest diameter draw to the boundary of the lesion and perpendicular to the primary (longest) previously drawn. These two measures are sometimes added to give a measure that accounts for the lesion not being circular in an axial slice.

Figure 2:
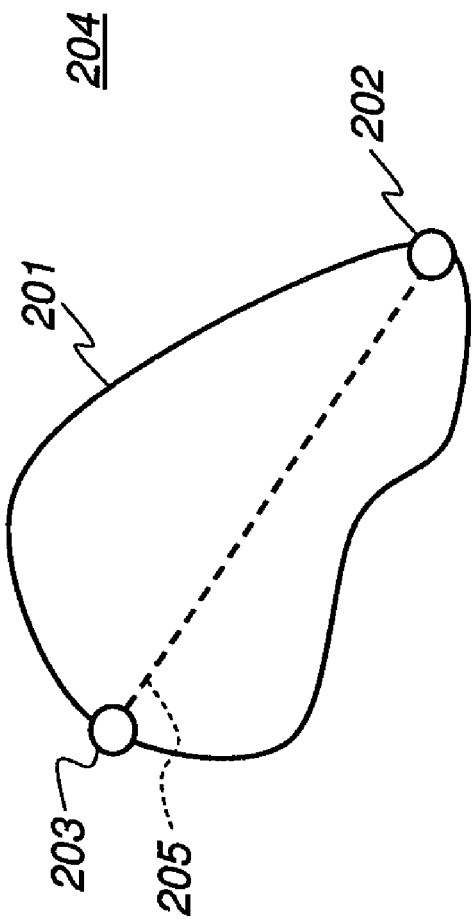
FIG. 2 is a diagram illustrating a lesion, its surrounding background, two selected points on a boundary, and a line segment drawn between the two points.

FIG. 2 depicts a typical use case scenario. Points 202 and 203 have been selected by the user to correspond to the identified anatomical region of interest, i.e., lesion 201. Note that points 202 and 203 are located on the boundary between the lesion 201 and the background region 204 that surrounds the lesion. The user of the system is instructed to choose two points that span lesion.

The technology described herein is described in the context of an image segmentation application. As such, embodiments of the present disclosure solve the problem of collecting statistical information that relates to a region or object of interest within a volumetric computed tomography (CT) exam. In particular, several numerical quantities relate to a tissue type spanning a geometric region of the image. For example, the mean voxel value, given in Hounsfield units (HU), tends to be a characteristic of a tissue type. The standard deviation of voxel values for a tissue type can be both a characteristic of the tissue type and/or indicative of the noise of the capture system. Both the mean and standard deviation of voxel values for the region associated with a lesion can be of help in the segmentation process of automatically identifying each voxel in the exam as either belonging to a lesion tissue region or belonging to the background or some other anatomical structure.

Referring to FIG. 2, lesion region 201 is shown as a geometric region. Two points span an anatomical region of interest when there exists voxels between the two points corresponding to the anatomical region of interest providing data for meaningful statistics. If the user selects points and the connecting line segment does not intersect the anatomical region on interest, then the statistics may not be meaningful. Also, if the user selects points that are extremely close, then the statistics may not be meaningful, as the number of samples is too small. In an exemplary embodiment, the points may be selected such that most of the voxels that lie along a line between the two selected points are part of the anatomical region of interest. Points 202 and 203 are an example of two points that span the lesion 201. In this particular case, points 202 and 203 lie on the boundary of the lesion tissue region and the background region 204.

For the two selected points shown in FIG. 2, statistical information relating to just the imaged lesion tissue can be collected by evaluating the voxels that lie along a theoretical line drawn between them shown as dotted line 205. This is the simple case of statistical information collection since the two selected points 201 and 202 lie on the boundary between the lesion region 201 and background region 204. However, embodiments of the present disclosure can also be used when the two selected points do not lie on the boundary between tissue regions.

Figure 3:
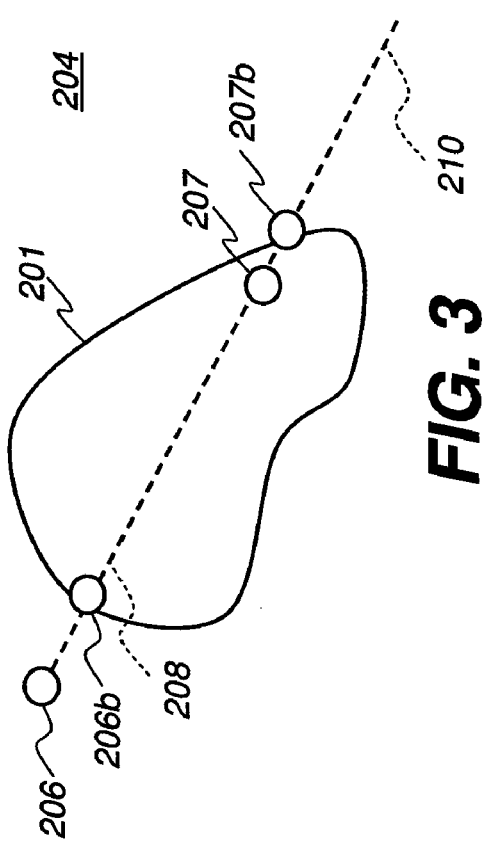
FIG. 3 is a diagram that shows lines extending from the two selected points.

FIG. 3 shows points 206 and 207 that are two different points that span lesion region 201. Note that point 206 does not lie on the boundary between lesion tissue region 201 and the background region 204, but is located entirely in the background region 204. Point 207 lies within lesion region 201. However, these two points also span the lesion region 201 because the voxels that lie along dotted line segment 208 between points 206 and 207 are associated with the lesion region 201.

An embodiment of the present disclosure uses spatial operators applied to the voxel image data to determine boundary points that lie along the line that connects the two selected points. Let the set of n voxel values that correspond to sequential locations ordered from the first selected point to the second selected point be represented by the sequence:

$$A=\{a_1, a_2, \ldots, a_n\}.$$

The differential signal D, i.e. another set of sequential voxel values, can be constructed wherein each element of D is calculated by taking the difference of sequential elements of A:

$$D=\{d_1, d_2, \ldots, d_{n-1}\},$$

where $$d_j=\{a_j-a_{j-1}\}.$$

It can be assumed that a difference in mean voxel value exists between the lesion region 201 and background region 204. For the case shown in FIG. 3, the voxel values in the immediate vicinity of selected point 206 will have values with an expected mean value corresponding to the background region 204. As points are evaluated in the sequence of values in the differential signal D, one or more of the values in the differential signal D will have a magnitude that exceeds a threshold T at corresponding locations to the boundary between the lesion region 201 and background region 204. The voxel location of such a condition in the differential signal D is shown as point 206b in FIG. 3.

Noise in the voxel values can produce spurious calculations for the location of the boundary between lesion tissue and background tissue. Noise filtering algorithms such as a median filter can be applied to the voxel image data prior to the calculation of boundary points. In addition, all subsequent processing, such as the segmentation processing, can be performed on the noise filtered voxel data instead of the original voxel data.

Point 207 shown in FIG. 3 lies within the lesion region 201. There is no appreciable differential signal, i.e. a differential signal D that is greater than the threshold value T, in the immediate vicinity of point 207. When this condition occurs, the selected point is assumed to be an interior lesion point. Boundary point 207b is calculated by extending a line (line 210) collinear with line 208. The differential signal D is then evaluated along line 210 to determine the boundary point.

A typical value for the threshold value T varies based on the expected mean value between the lesion tissue and background tissue. When segmenting pulmonary lesions, a reasonable value for the threshold may be approximately 150 HU. While segmenting liver lesions, a reasonable value for the threshold T may be approximately 20 HU. Threshold values for other types of anatomical regions of interest can also be found by experimenting with CT exam data.

When the anatomical region of interest is not known a priori the threshold value T may be calculated from the voxel data. Line 208 can be extended in both directions and a corresponding differential signal is calculated using points sampled along the extended line. A noise filter is first applied to the voxel data as described above, and all subsequent calculations are performed on the noise filtered voxel data. Using sampled voxel values that lie between the two selected points, a median voxel value is found. Using the median value helps to reject any boundary transitions that occur along the line if one of the two selected points was an exterior point. The median value is then taken as the characteristic value for the lesion region. The standard deviation of voxel values sampled along the line between the two selected points is then used to determine two threshold values, i.e. a $T_{high}$ and $T_{low}$. An exemplary method for calculating the value of $T_{high}$ is the median value plus two standard deviation units. The value of $T_{low}$ is calculated as the median value minus two standard deviation units.

Thus, the two selected points that span a lesion can be chosen to be either inside or outside the lesion tissue region or can be chosen to be on the boundary between the lesion tissue region and the background tissue region. This flexibility accounts for users of the system who are not always precise when selecting points. For example, when radiologists select two points to measure the diameter of a lesion there is often variability in the measured diameter outcome when different observers measure the same lesion. This is due to a variety of factors. For example, the boundary between lesion and background tissues can be exhibited over not just one voxel but 2 or 3 voxels. Not all observers agree on the exact location of the boundary. Also a confusing factor adding to the variability of such measurements is the fact that many observers prefer to perform lesion diameter measurements while viewing the lesion at a relatively low magnification factor. This causes variability due to the coarseness' of the visual presentation of the lesion.

In an alternative embodiment, the spatial operator is not applied to the voxel image data prior to the collection of statistical information. An inner fraction of the linear distance between the two selected points is used as the set of voxels from which to collect statistics. Typically an inner fraction of 50% yields good results in practice.

The two selected points define the equation of a line. This line is an example of a path, in this case a straight line, defined by the selected two points. Voxel data values are sampled along the line between the two selected points. However, other paths defined by two points can also be used as a basis for sampling the local voxel values. For example, Gohen and Kimmel describe a method for defining a path of minimum gradient in the journal article "Global Minimum for Active Contour Models: A Minimal Path Approach", International Journal of Computer Vision, vol. 24, no. 1 pp. 57-78, August 1997.

Exemplary embodiments of the present disclosure can be used with selected points that lie near but not necessarily on the boundary between lesion and background tissues. Statistics associated with just the lesion region can be collected. It is understood that the mean value for lesions can vary substantially while the mean voxel value for background tissues is expected to fall within prescribed ranges. For the case of pulmonary lesions, the expected mean voxel value for the lung parenchyma tissue as background may range between approximately −950 and approximately −850 HU. The mean voxel value associated with lesion tissue can range between approximately −500 and approximately +1500 HU.

Along with the mean voxel value, the minimum, maximum, and standard deviation of voxel values associated with the lesion tissue is also calculated. A threshold value $\tau_{low}$ and $\tau_{high}$ are calculated. The threshold value $\tau_{low}$ may be set to a value that is two standard deviation units below the minimum lesion sampled value. The threshold value $\tau_{high}$ may be set to a value that is two standard deviation units above the maximum lesion sample value. The lesion region can then be segmented by finding all voxel values that lie between the two threshold values value $\tau_{low}$ and $\tau_{high}$ resulting in a segmentation map.

Figure 4:
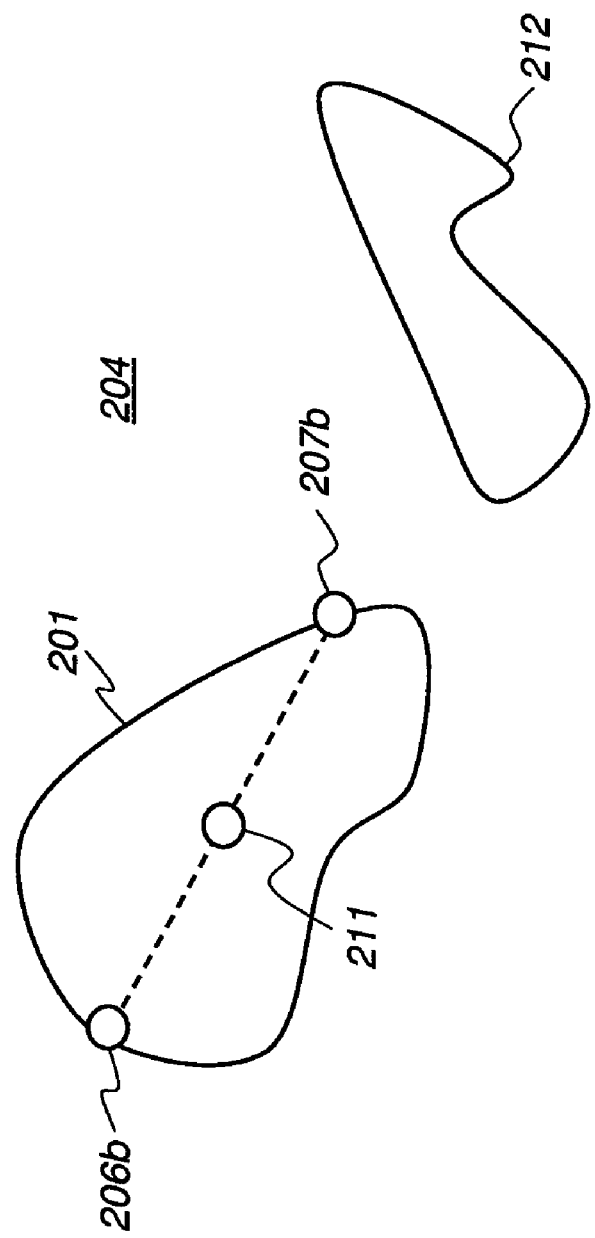
FIG. 4 is a diagram that shows regions classified after a first segmentation processing step.

Many voxels not associated with the identified lesion can be accepted by the previously described operation. Such a region is shown in FIG. 4 as region 212. A connected component analysis is performed on the segmentation map using a seed value constructed as the mid-point 211 between the two points 206b and 207b shown in FIG. 4.

Figure 5:
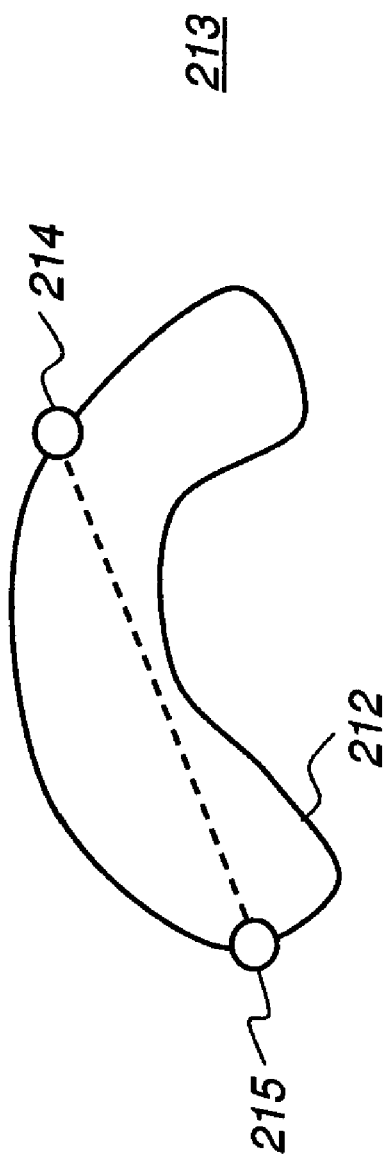
FIG. 5 is a diagram showing two selected points for an irregularly shaped anatomical region or object of interest.

FIG. 5 shows an example of an irregularly shaped lesion 212 and background region 213. For this type of lesion, points 214 and 215 can be selected to span the lesion. In such an exemplary embodiment, users of the system may be instructed to select points having the mid-point within the lesion.

The action required by the user to draw the RECIST diameter, or just a representative diameter for a region of interest such as a pulmonary lesion, is very similar to the action via the GUI for the selection of the points 202 and 203 shown in FIG. 2. However, as is typically required in clinical practice, the radiologist as the user of a PACS must select points that are located on the boundary between lesion and background tissue.

Embodiments of the present disclosure can be used in an alternative mode to perform both a segmentation of a region of interest and a RECIST diameter measurement simultaneously. For example, the user may select two points that span the region of interest shown as points 206 and 207 in FIG. 3. The corresponding boundary points associated with the region of interest are calculated from the two user selected points as described above and depicted as points 206b and 207b also shown in FIG. 3. The software then draws a line in the GUI between the two calculated boundary points and displays the length of the line in the GUI. The collection of statistical points can proceed as described above. In this alternative mode of operation, the user is free to choose the two selected points that span the region of interest for which the two selected points are not precisely on the boundary between the region of interest and its background. The characteristic diameter of the region of interest is still calculated and drawn accurately.

It is common practice in imaging processing to collect statistical information from image data prior to the application of an image processing algorithm. Typically, image data is sampled within a designated area of a 2-dimensional image or a volume or area of a 3-dimensional image. If the application is interactive, the user can guide the location of the sampling area by selecting a region of interest. Statistical information is then sampled from the region of interest, which is a sub-volume of the entire CT image data set.

As discussed above, embodiments of the present disclosure use two selected points, supplied by the user of a PACS through a GUI, to indicate the location of a lesion as an anatomical region or object of interest. The software then samples image data along a path, in the simplest case a line defined by the two selected points. The segmentation results obtained from sampling statistics from points along the line provide sufficient statistics for the intended clinical applications. Additionally, points sampled along a line generated from two points that span a lesion tend to be more related to the identified lesion. For example, points could be sampled from a rectangular region defined by two selected points but the sampling region could contain much non-lesion tissue data.

An advantage of the embodiments of the present disclosure stems from the uniqueness of the application scenario. In known segmentation methods, the only statistical information known with certainty is that a click point is within the lesion and, therefore, is a representative value of the lesion tissue. In contrast, in the embodiments of the present disclosure it is known with certainty that the two selected points span the anatomical region of interest. Thus, the methods described herein take advantage of a priori knowledge to reliably sample statistical information from the image data that lies between the two selected points.

While the present disclosure includes descriptions of various preferred embodiments, it should be understood by those having skill in the art that the descriptions herein are merely exemplary and that various changes may be made and equivalents may be substituted for elements thereof without departing from the scope of the invention. Therefore, it is intended that the invention not be limited to the best mode of carrying out this invention or to the particular embodiments disclosed herein, but that the invention will include all embodiments falling within the scope and spirit of the appended claims.

PARTS LIST 10a image capture device
10b image capture device
42a electronic display device
42b electronic display device
44a input control device
44b input control device
60 mobile computer
110 communications network
120 diagnostic workstation computer
140 image archive computer
150 software application program
201 lesion region
202 selected point
203 selected point
204 background region
205 line
206 selected point
206b boundary point
207 selected point
207b boundary point
208 line
210 line
211 point
212 lesion region
213 background region
214 selected point
215 selected point

The invention claimed is:

1. A method of collecting information regarding an anatomical object of interest from image voxels in a digital image, the method executed at least in part on a computer, comprising:

displaying the digital image characterized by a background region and a second region, wherein the background and second regions are mutually exclusive and the anatomical object of interest is displayed within the second region;

selecting first and second points spanning the anatomical object of interest in the displayed image, at least one of the first and second points being within the background region;

evaluating image voxels lying on a line segment between the first and second points that correspond to the anatomical object of interest and obtaining one or more statistical values from the evaluated voxels;

processing the digital image according to the obtained one or more statistical values; and displaying the processed digital image.

2. The method of claim 1, wherein the background region corresponds to a first tissue type and the second region corresponds to a second tissue type different than the first tissue type.

3. The method of claim 1, wherein voxels lying on the line segment that correspond to the background region are characterized by a first mean voxel value, and voxels lying on the line segment that correspond to the second region are characterized by a second mean voxel value greater than the first mean voxel value.

4. The method of claim 1, further including calculating a probability distribution based on the one or more obtained statistical values.

5. The method of claim 1, further including applying a noise filtering algorithm, using the computer, to a plurality of voxel values associated with the image voxels, wherein the one or more obtained statistical values are extracted from the noise-filtered voxel values.

6. The method of claim 5, further including segmenting the second region into a target portion and a remainder portion based on the noise-filtered voxel values.

7. The method of claim 1, wherein processing the digital image comprises segmenting the second region into a target portion and a remainder portion based on the one or more statistical values.

8. The method of claim 7, wherein segmenting the second region comprises calculating threshold values based on the one or more obtained statistical values and classifying the image voxels based on the calculated threshold values.

9. The method of claim 8, further including calculating a standard deviation of the one or more obtained statistical values, wherein the threshold values are calculated using the standard deviation and a median value of the one or more obtained statistical values.

10. The method of claim 1, wherein the anatomical object of interest comprises a lesion.

11. A method of collecting information regarding an anatomical object of interest, from image voxels in a digital image, the method executed at least in part on a computer, comprising:

displaying the digital image illustrating a background region and a second region, wherein the anatomical object of interest is displayed within the second region;

selecting and displaying first and second points spanning the anatomical object of interest in the displayed image, at least one of the first and second points being within the background region;

evaluating image voxels lying on a line segment between the first and second points that correspond to the anatomical object of interest and obtaining one or more statistical values from the evaluated voxels;

determining a median statistical value from the one or more obtained statistical values;

determining an upper threshold value and a lower threshold value based on the median statistical value;

segmenting the anatomical object of interest within the digital image according to the upper and lower threshold values; and displaying the segmentation results.

12. The method of claim 11, further including calculating a standard deviation of the one or more obtained statistical values, wherein the upper and lower threshold values are based on the standard deviation and the median statistical value.

13. The method of claim 11, further including classifying each of the image voxels based on the upper and lower threshold values.

14. The method of claim 11, further including calculating a set of noise-filtered voxel values corresponding to the image voxels.

15. The method of claim 14, further including segmenting the image based on the set of noise-filtered voxel values.

16. The method of claim 11, wherein the anatomical object of interest comprises a lesion.

17. A method of collecting information regarding an anatomical object of interest within a digital image comprising a plurality of image voxels, the method executed at least in part on a computer, comprising:

displaying an image of a boundary of the anatomical object of interest;

selecting first and second points proximate the boundary, the first and second points approximating end points of a maximum diameter defined by the boundary;

generating a first boundary point, the first boundary point being formed by the intersection of the boundary, and a line passing through the first and second points;

generating a second boundary point, the second boundary point being formed by the intersection of the boundary and the line;

extracting one or more statistical values from image voxels corresponding to points on the line between the first and second boundary points; and processing the digital image according to the extracted one or more statistical values and displaying the processed digital image.

18. The method of claim 17, further including calculating a set of noise-filtered voxel values corresponding to the points on the line between the first and second boundary points, and segmenting the boundary based on the set of noise-filtered voxel values.

19. The method of claim 17 wherein processing the digital image comprises segmenting the boundary into a target portion and a remainder portion based on the one or more statistical values.

20. The method of claim 17, further including calculating threshold values and characterizing image voxels corresponding to the points on the line between the first and second boundary points based on the calculated threshold values.

* * * * *